United States Patent
Eismark et al.

(10) Patent No.: US 12,253,046 B2
(45) Date of Patent: Mar. 18, 2025

(54) INTERNAL COMBUSTION ENGINE FOR GASEOUS FUEL

(71) Applicant: Volvo Truck Corporation, Gothenburg (SE)

(72) Inventors: Jan Eismark, Gothenburg (SE); Tommy Simonsson, Stenungsund (SE); Rickard Ehleskog, Hisings Backa (SE); Gustavo Hindi, Alafors (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/386,776

(22) Filed: Nov. 3, 2023

(65) Prior Publication Data

US 2024/0068426 A1 Feb. 29, 2024

Related U.S. Application Data

(63) Continuation of application No. 18/079,594, filed on Dec. 12, 2022, now Pat. No. 11,840,984.

(30) Foreign Application Priority Data

Dec. 17, 2021 (EP) ..................... 21215388

(51) Int. Cl.
*F02F 3/00* (2006.01)
*F02B 3/02* (2006.01)
*F02F 3/24* (2006.01)

(52) U.S. Cl.
CPC .................. *F02F 3/24* (2013.01); *F02B 3/02* (2013.01); *F02B 2201/04* (2013.01); *F02B 2275/40* (2013.01)

(58) Field of Classification Search
CPC .......... F02B 2075/125; F02B 2023/108; F02B 2275/14; F02F 3/26

(Continued)

(56) References Cited

U.S. PATENT DOCUMENTS

| | | | |
|---|---|---|---|
| 3,504,681 | A | 4/1970 | Winkler |
| 4,344,408 | A | 8/1982 | Inoue et al. |

(Continued)

FOREIGN PATENT DOCUMENTS

| | | |
|---|---|---|
| EP | 0839997 A1 | 5/1998 |
| EP | 0875670 A2 | 11/1998 |
| JP | H04370319 A | 12/1992 |

OTHER PUBLICATIONS

Extended European Search Report, for European Patent Application No. 21215388.6, mailed May 24, 2022, 17 pages.

*Primary Examiner* — Long T Tran
*Assistant Examiner* — James J Kim
(74) *Attorney, Agent, or Firm* — Sage Patent Group

(57) ABSTRACT

An internal combustion engine for gaseous fuel includes a cylinder and a piston for reciprocal movement in the cylinder along a reciprocal axis, whereby a combustion chamber is at least partially delimited by the cylinder and the piston. The piston includes a piston crown facing the combustion chamber, a piston crown projection of the piston crown in a direction parallel to the reciprocal axis and onto a piston crown plane extending transversally to the reciprocal axis having a piston crown center point, the piston crown comprising a piston bowl surface defining a piston bowl and a piston rim portion enclosing the piston bowl surface. A piston bowl opening is the intersection between the piston rim portion and the piston bowl surface. The piston bowl opening has an opening center of gravity in the piston crown plane. The opening center of gravity is offset from the piston crown center point.

20 Claims, 11 Drawing Sheets

(58) Field of Classification Search
USPC .................................................. 123/193.6
See application file for complete search history.

(56) References Cited

U.S. PATENT DOCUMENTS

| | | | |
|---|---|---|---|
| 4,480,625 A | 11/1984 | Kanda et al. | |
| 4,763,624 A | 8/1988 | Deckers | |
| 4,958,604 A | 9/1990 | Hashimoto | |
| 6,269,790 B1 * | 8/2001 | Yi | F02B 23/104 |
| | | | 123/301 |
| 6,460,509 B1 | 10/2002 | Muramatsu | |
| 6,494,178 B1 * | 12/2002 | Cleary | F02B 23/104 |
| | | | 123/193.6 |
| 6,588,396 B1 * | 7/2003 | Cleary | F02F 3/26 |
| | | | 123/301 |
| 6,659,070 B2 * | 12/2003 | Sebastian | F02M 61/1806 |
| | | | 123/298 |
| 6,708,667 B2 * | 3/2004 | Suzuki | F02B 23/104 |
| | | | 123/301 |
| 8,701,626 B2 * | 4/2014 | Gu | F02B 23/105 |
| | | | 123/41.35 |
| 9,903,284 B1 | 2/2018 | Lavertu | |
| 11,719,173 B2 * | 8/2023 | Graumueller | F02M 21/0248 |
| | | | 123/299 |
| 2009/0114185 A1 | 5/2009 | Knop et al. | |
| 2014/0130777 A1 | 5/2014 | Kuroki et al. | |
| 2015/0021417 A1 * | 1/2015 | Ukropec | C25D 11/26 |
| | | | 239/584 |
| 2017/0342915 A1 * | 11/2017 | Kjemtrup | F02M 21/0275 |
| 2020/0166000 A1 | 5/2020 | Matsuo | |
| 2020/0166002 A1 * | 5/2020 | Kim | F02M 61/14 |
| 2022/0120211 A1 | 4/2022 | Matsuoka | |

* cited by examiner

INTERNAL COMBUSTION ENGINE FOR GASEOUS FUEL

CROSS REFERENCE TO RELATED APPLICATIONS

This application is a continuation of U.S. patent application Ser. No. 18/079,594 titled "INTERNAL COMBUSTION ENGINE FOR GASEOUS FUEL," filed Dec. 12, 2022, which claims priority to European Patent Application No. 21215388.6, filed on Dec. 17, 2021, the disclosure and content of which are incorporated by reference herein in their entireties.

TECHNICAL FIELD

The present disclosure relates to an internal combustion engine for gaseous fuel. Moreover, the present disclosure relates to a vehicle.

The disclosure can be applied in heavy-duty vehicles, such as trucks, buses and construction equipment. Although the disclosure will be described with respect to a truck, the disclosure is not restricted to this particular vehicle, but may also be used in other vehicles such as working machines and seagoing vessels such as boats. Moreover, the present disclosure may be used in stationary applications, such as power generators and the like.

BACKGROUND

There has been a recent interest in the development of internal combustion engines for gaseous fuel. Purely by way of example, a gaseous fuel may comprise or consist of hydrogen gas. In order to achieve a proper combustion of the gaseous fuel, it is generally desired that the gaseous fuel be appropriately mixed in the combustion chamber. For gaseous fuels, this may be challenging since a gaseous fuel is generally associated with a lower density, and thus a lower injection momentum, than a liquid fuel, such as diesel for example.

SUMMARY

An object of the disclosure is to provide an internal combustion engine which allows for appropriate combustion of gaseous fuel.

According to a first aspect of the disclosure, the object is achieved by an internal combustion engine according to claim 1.

As such, the first aspect of the present disclosure relates to an internal combustion engine for gaseous fuel. The internal combustion engine comprises a cylinder and a piston for reciprocal movement in the cylinder along a reciprocal axis, whereby a combustion chamber is at least partially delimited by the cylinder and the piston. The piston comprises a piston crown facing the combustion chamber. A piston crown projection of the piston crown in a direction parallel to the reciprocal axis and onto a piston crown plane extends transversally to the reciprocal axis has a piston crown center point.

The piston comprises a piston bowl surface, defining a piston bowl, and a piston rim portion. The piston rim portion encloses the piston bowl surface and a piston bowl opening is the intersection between the piston rim portion and the piston bowl surface. The piston bowl opening has an opening center of gravity in the piston crown plane. The opening center of gravity is offset from the piston crown center point. A first separating plane extends in a first direction as well as in a direction parallel to the reciprocal axis and intersects the piston crown center point as well as the opening center of gravity. A second separating plane extends in a second direction transversal to the first direction as well as in a direction parallel to the reciprocal axis and intersects the opening center of gravity.

The piston bowl surface has two halves: a proximal piston bowl surface half and a distal piston bowl surface half, the piston bowl surface halves being separated by the second separating plane, wherein the proximal piston bowl surface half is located on the same side of the second separating plane as the piston crown center point. The internal combustion engine further comprises a spark plug adapted to produce a spark in the combustion chamber. The internal combustion engine further comprises a fuel injector for injecting gaseous fuel into the combustion chamber such that, during operation of the internal combustion engine, a majority of fuel discharged from the fuel injector is directed towards and impinges on either the proximal piston bowl surface half or the distal piston bowl surface half.

The internal combustion engine according to the above implies that gaseous fuel may be injected so as to impinge on the distal piston bowl surface half and such that the fuel may thereafter be reflected towards the proximal piston bowl surface half, or alternatively that the gaseous fuel may be injected so as to impinge on the proximal piston bowl surface half such that the fuel may thereafter be reflected towards the distal piston bowl surface half, as a consequence of which a tumble motion is obtained for the fuel. Such a tumble motion in turn implies an appropriate mixing of fuel and e.g., air and/or oxygen in order to ensure an appropriate combustion.

Optionally, an opening center of gravity to spark plug distance, in the first direction, from the opening center of gravity to the spark plug, is smaller than a piston crown center point to spark plug distance, in the first direction, from the piston crown center point to the spark plug.

Optionally, the piston crown projection has an outer circumference with a circumference measure value. The opening center of gravity to spark plug distance being less than at least 10%, preferably less than 5%, more preferred less than 1%, of the circumference measure value.

Optionally, a spark plug projection, being a projection of the spark plug in a direction parallel to the reciprocal axis and onto the piston crown plane, is located in the second separating plane or in the distal piston bowl surface half.

Optionally, the majority of fuel is at least 60%, preferably at least 70%, more preferred at least 80%, of fuel discharged from the fuel injector. As indicated above, the majority of fuel discharged from the fuel injector is directed towards and impinges on the distal piston bowl surface half. As such, though optionally, at least 60%, preferably at least 70%, more preferred at least 80%, of fuel discharged from the fuel injector is directed towards and impinges on the distal piston bowl surface half.

Optionally, the fuel injector is adapted to discharge gaseous fuel at a mean fuel injector exit velocity being equal to or exceeding 800 m/s, preferably equal to or exceeding 1200 m/s, more preferred equal to or exceeding 1600 m/s. A fuel injector exit velocity equal to or above any one of the above limits implies appropriate injection of gaseous fuel.

Optionally, the fuel injector is adapted to discharge gaseous fuel at a discharge pressure being equal to or lower than 500 bar, preferably equal to or lower than 300 bar, more preferred equal to or lower than 100 bar. Unlike the injection of liquid fuel, gaseous fuel may be injected at a relatively low pressure, e.g., equal to or below any one of the above-mentioned limits.

Optionally, the piston rim portion extends in a rim portion plane being parallel to the piston crown plane. The piston bowl surface is located on the side of the piston rim portion plane being opposite to the combustion chamber. As such, the piston rim portion may be flat and the piston bowl may be regarded as cavity in the piston crown.

Optionally, the fuel injector for injecting gaseous fuel into the combustion chamber is such that, during operation of the internal combustion engine, a majority of fuel discharged from the fuel injector is directed towards and impinges on the distal piston bowl surface half.

Optionally, the distal piston bowl surface half comprises a distal piston bowl side wall and the proximal piston bowl surface half comprises a proximal piston bowl side wall. At least portions of the distal piston bowl side wall and the proximal piston bowl side wall are connected to each other via a piston bowl bottom. The piston bowl bottom implies an appropriate transfer of fuel from the distal piston bowl surface half to the proximal piston bowl surface half.

Optionally, the piston bowl surface has a piston bowl depth being the largest distance from the piston bowl opening to the piston bowl surface, as seen along the reciprocal axis. An upper portion of the proximal piston bowl side wall extends from the piston rim portion and in a direction into the piston bowl, as seen along the reciprocal axis, in a range of 0-50%, preferably in a range of 0-30%, more preferred in a range of 0-20%, of the piston bowl depth. The upper portion of the proximal piston bowl side wall comprises an opening protrusion extending in a direction towards an intersection line formed by the intersection of the first separating plane and the second separating plane.

The opening protrusion in accordance with the above implies that a local turbulence may be obtained at the proximal piston bowl side wall. Such a local turbulence in turn implies an appropriate mixing of fuel and e.g., air.

Optionally, the piston crown projection has an outer circumference with a circumference measure value. The opening protrusion has an opening protrusion width being a measure from a portion of the piston bowl surface adjacent to the opening protrusion to the portion of the opening protrusion being closest to the intersection line. The protrusion width is in the range of 0.01-1% of the circumference measure value. A protrusion width within the above range implies an appropriately large possibility for turbulence flow generation.

Optionally, the opening protrusion has an opening protrusion height in the reciprocal axis. The opening protrusion height is in the range of 20-200%, preferably 50-150%, of the opening protrusion width. Again, a height within any one of the above ranges implies an appropriately large possibility for turbulence flow generation.

Optionally, the opening protrusion has an opening protrusion angular extension around the intersection line. The opening protrusion angular extension is in the range of 100-240°, preferably in the range of 160-200°. An opening protrusion angular extension within any one of the above ranges implies that at least the majority of fuel that is forwarded from the distal piston bowl side wall to the proximal piston bowl side wall may contact the opening protrusion such that a turbulent flow is obtained.

Optionally, the fuel injector for injecting gaseous fuel into the combustion chamber is such that, during operation of the internal combustion engine, a majority of fuel discharged from the fuel injector is directed towards and impinges on the proximal piston bowl surface half.

Optionally, the distal piston bowl surface half comprises a distal piston bowl side wall and the proximal piston bowl surface half comprises a proximal piston bowl side wall. At least portions of the distal piston bowl side wall and the proximal piston bowl side wall are connected to each other via a piston bowl bottom.

Optionally, the fuel injector comprises a first opening and a second opening. The first opening is adapted to discharge gaseous fuel in a first opening direction and the second opening being adapted to discharge gaseous fuel in a second opening direction, the first opening direction and the second opening direction forming an angle in a range of 10°-80°, preferably in a range of 15°-60°, more preferred in a range of 20°-40°.

Optionally, each one of the first opening direction and the second opening direction forms an angle with a reference plane being parallel to the second separating plane. The absolute value of the angle is in the range of 0-5°, preferably in the range of 0-2°.

Optionally, each one of the first opening direction and the second opening direction forms an angle with a reference plane being parallel to the first separating plane. The absolute value of the angle is in the range of 0-5°, preferably in the range of 0-2°.

Optionally, each one of the first opening direction and the second opening direction forms an angle with a reference plane being parallel to the second separating plane. The absolute value of the angle is in the range of 0-5°, preferably in the range of 0-2°.

Optionally, the fuel injector comprises a third opening. The third opening is adapted to discharge gaseous fuel in a third opening direction. The third opening direction forms an angle with a second reference plane being parallel to the second separating plane. The absolute value of the angle is in the range of 5°-30°, preferably in the range of 10°-20°.

Optionally, the fuel injector comprises a fourth opening, the fourth opening being adapted to discharge gaseous fuel in a fourth opening direction. The third opening direction and the fourth opening direction being in opposite directions from the second reference plane. The fourth opening direction forms an angle with the second reference plane. The absolute value of the angle is in the range of 5°-30°, preferably in the range of 10°-20°.

Optionally, said fuel injector comprises at least six openings, preferably at least eight openings.

Optionally, the piston crown projection has an outer circumference with a circumference measure value, a distance between the piston crown center point and the opening center of gravity, in the piston crown plane, being at least 1%, preferably at least 2%, of the circumference measure value.

Optionally, the piston crown has a single piston bowl.

Optionally, the internal combustion engine further comprises a cylinder head with a cylinder head surface facing the piston crown and at least partially delimiting the combustion chamber.

Optionally, the cylinder head surface extends in a cylinder head surface plane. The cylinder head surface plane and the piston crown plane form an angle that is less than 10°, preferably less than 5°, more preferred the cylinder head surface plane is parallel to the piston crown plane.

Optionally, the fuel injector is at least partially arranged in the cylinder head.

Optionally, the spark plug is at least partially arranged in the cylinder head.

Optionally, the fuel injector is adapted to inject hydrogen fuel into the combustion chamber.

A second aspect of the present disclosure relates to a drive arrangement comprising an internal combustion engine according to the first aspect of the present disclosure and a hydrogen fuel supply system for supplying hydrogen fuel to the fuel injector. Preferably, the hydrogen fuel supply system comprises a tank for storing hydrogen fuel.

A third aspect of the present disclosure relates to a vehicle comprising the internal combustion engine according to the first aspect of the present disclosure or a drive arrangement according to the second aspect of the present disclosure.

Further advantages and advantageous features of the disclosure are disclosed in the following description and in the dependent claims.

Moreover, a fourth aspect of the present disclosure relates to an internal combustion engine for gaseous fuel. The internal combustion engine comprises a cylinder and a piston for reciprocal movement in the cylinder along a reciprocal axis, whereby a combustion chamber is at least partially delimited by the cylinder and the piston. The piston comprises a piston crown facing the combustion chamber. A piston crown projection of the piston crown in a direction parallel to the reciprocal axis and onto a piston crown plane extends transversally to the reciprocal axis has a piston crown center point.

The piston comprises a piston bowl surface, defining a piston bowl, and a piston rim portion. The piston rim portion encloses the piston bowl surface and a piston bowl opening is the intersection between the piston rim portion and the piston bowl surface. The piston bowl opening has an opening center of gravity in the piston crown plane. The opening center of gravity is offset from the piston crown center point.

The internal combustion engine further comprises a spark plug adapted to produce a spark in the combustion chamber. The internal combustion engine further comprises a fuel injector for injecting gaseous fuel into the combustion chamber such that gaseous fuel is injected into the piston bowl.

The fourth aspect of the present disclosure implies an appropriate mixture of gaseous fuel and e.g., air before and/or during combustion. It should be noted that the fourth aspect of the present disclosure may be combined with any feature or features presented hereinabove with reference to any one of the first to third aspects of the present disclosure.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
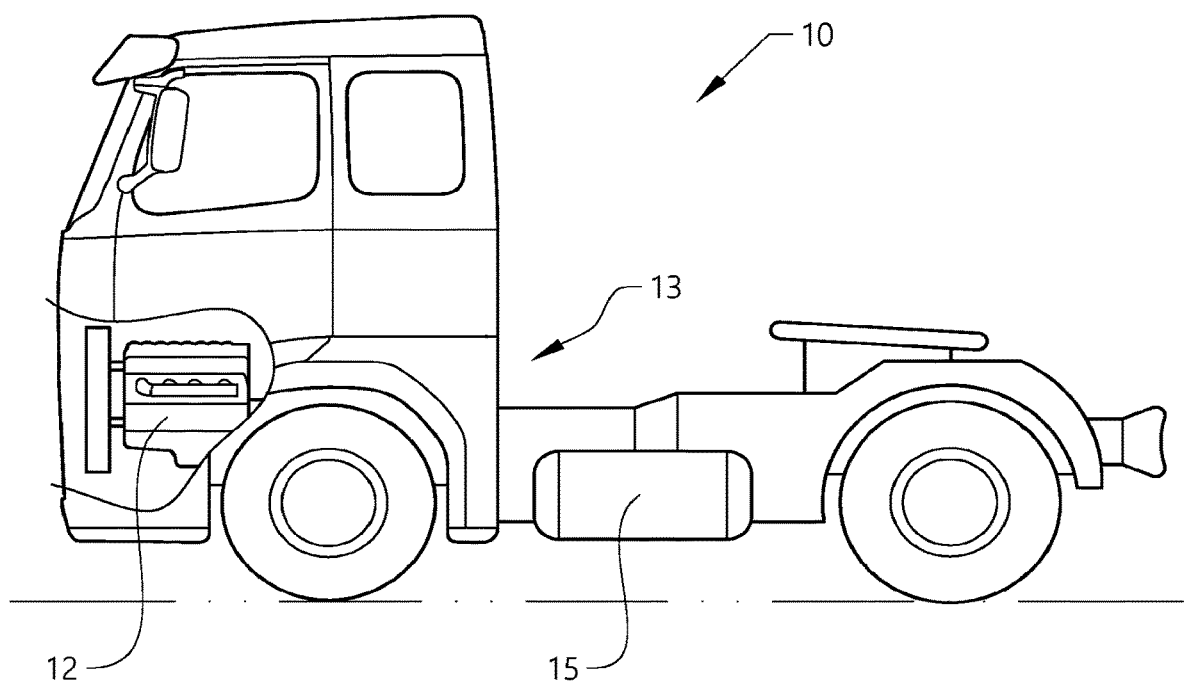
FIG. 1 is a schematic view of a vehicle.

FIG. 1 illustrates a vehicle, for example a truck 10, comprising an internal combustion engine 12 for gaseous fuel. Purely by way of example, the vehicle 10 may comprise a drive arrangement 13 comprising an internal combustion engine 12 and a hydrogen fuel supply system 15 for supplying hydrogen fuel to the fuel injector. Preferably, and as indicated in FIG. 1, the hydrogen fuel supply system 15 may comprise a tank for storing hydrogen fuel.

For the sake of completeness, it should be noted that the internal combustion engine 12 and/or the drive arrangement 13 according to the present disclosure may be used in other applications than a vehicle 10.

Figure 2:
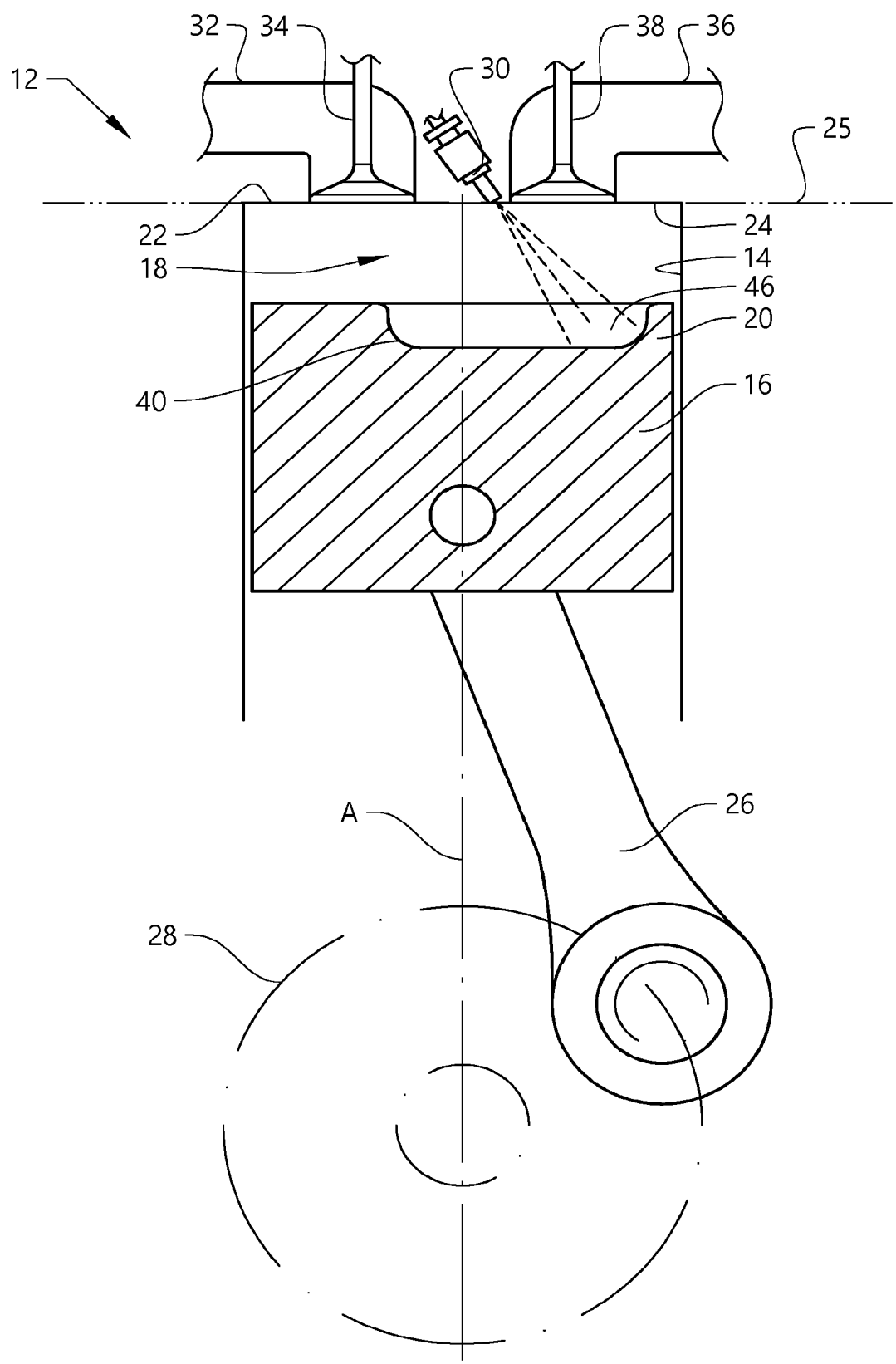
FIG. 2 illustrates a schematic side view of a portion of an embodiment of an internal combustion engine in accordance with the present disclosure.

FIG. 2 illustrates a cross-sectional view of a portion of an internal combustion engine 12 in accordance with an embodiment of the present disclosure. As indicated in FIG. 2, the internal combustion engine 12 comprises a cylinder 14 and a piston 16 for reciprocal movement in the cylinder along a reciprocal axis A, whereby a combustion chamber 18 is at least partially delimited by the cylinder 14 and the piston 16. The piston 16 comprises a piston crown 20 facing the combustion chamber 18. Purely by way of example, and as indicated in FIG. 2, the internal combustion engine 12 may further comprise a cylinder head 22 with a cylinder head surface 24 facing the piston crown 20 and at least partially delimiting the combustion chamber. Further possible implementations of the cylinder head 22 will be elaborated on hereinbelow. As indicated in FIG. 2, the cylinder head surface 24 may extend in a cylinder head surface plane 25.

As illustrated in FIG. 2, though purely by way of example, the piston 16 may be mechanically connected, for instance via a connecting rod 26 as exemplified in FIG. 2, to a crankshaft 28 of the engine 12, whereby the piston 16 is movable in the cylinder 14 between a top and a bottom dead center position, respectively.

Moreover, as may be gleaned from FIG. 2, the internal combustion engine 12 further comprises a fuel injector 30 for injecting gaseous fuel into the combustion chamber 18. Purely by way of example, and as indicated in FIG. 2, the fuel injector 30 may be at least partially arranged in the cylinder head 22. It should be noted that FIG. 2 merely presents an example of a fuel injector 30 and that it is envisaged that embodiments of the internal combustion engine 12 may comprise a fuel injector 30 that is positioned and/or oriented in a manner being different from what is exemplified in FIG. 2.

Moreover, as exemplified in FIG. 2, the internal combustion engine 12 may comprise one or more inlet ports 32 with corresponding inlet valves 34. Purely by way of example, and as indicated in FIG. 2, the inlet valve or valves 34 may be at least partially arranged in the cylinder head 22. In a similar vein, again as exemplified in FIG. 2, the internal combustion engine 12 may comprise one or more exhaust ports 36 with corresponding exhaust valves 38. Purely by way of example, and as indicated in FIG. 2, the exhaust valve or valves 38 may be at least partially arranged in the cylinder head 22.

Furthermore, as indicated in FIG. 2, the piston comprises a piston bowl surface defining a piston bowl 46. Details of the piston bowl surface 40 and the piston bowl 46 will be presented hereinbelow.

Figure 3:
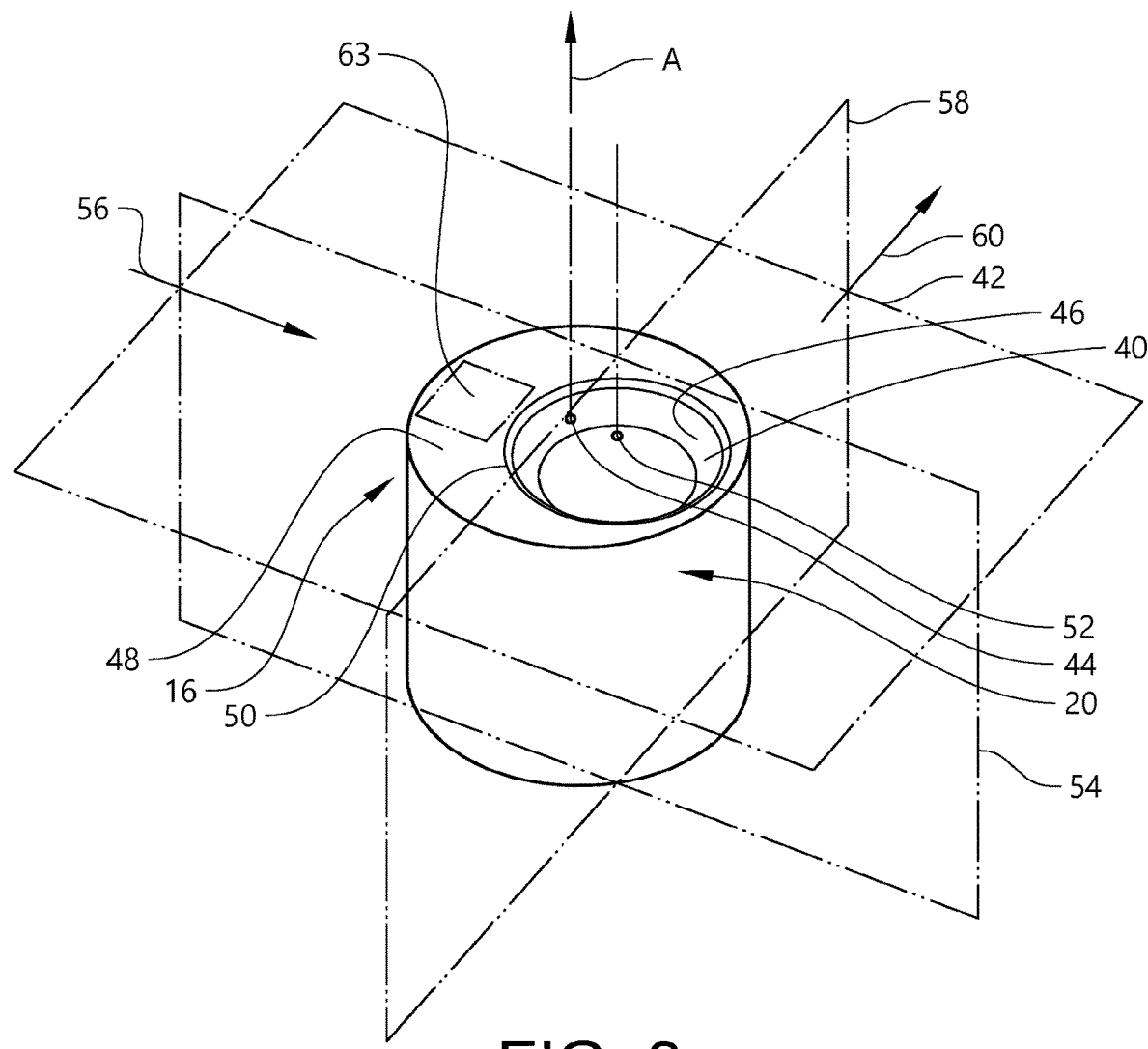
FIG. 3 illustrates a piston that may be used in the present disclosure.

As such, FIG. 3 illustrates a piston 16 which comprises a piston crown 20 facing the combustion chamber (see FIG. 2). A piston crown projection of the piston crown in a direction parallel to the reciprocal axis A and onto a piston crown plane 42 extending transversally to the reciprocal axis has a piston crown center point 44.

Purely by way of example, the cylinder head surface plane 25 (see FIG. 2) and the piston crown plane 42 may form an angle being less than 10°, preferably less than 5°. More preferred the cylinder head surface plane 25 is parallel to the piston crown plane 42.

Moreover, as indicted in FIG. 3, the piston 16 comprises a piston bowl surface 40, defining a piston bowl 46, and a piston rim portion 48, wherein the piston rim portion 48 encloses the piston bowl surface 40 and a piston bowl opening 50 is the intersection between the piston rim portion 48 and the piston bowl surface 40. In the embodiment illustrated in FIG. 3, the piston bowl opening 50 is circular. However, it is also contemplated that the piston bowl opening 50 may have other shapes, such as oval or the like.

The piston bowl opening 50 has an opening center of gravity 52 in the piston crown plane 42. The opening center of gravity 52 is offset from the piston crown center point 44. A first separating plane 54 extends in a first direction 56 as well as in a direction parallel to the reciprocal axis A and intersects the piston crown center point 44 as well as the opening center of gravity 52. A second separating plane 58 extends in a second direction 60 transversal to the first direction 56 as well as in a direction parallel to the reciprocal axis A and intersects the opening center of gravity 52.

Moreover, as indicated in FIG. 3, the piston rim portion 48 may extend in a rim portion plane 63 being parallel to the piston crown plane 42. Generally, and as exemplified in FIG. 3, the rim portion plane 63 may coincide with the piston crown plane 42. Moreover, the piston bowl is located on the side of the piston rim portion plane 63 that is opposite to the combustion chamber (not shown in FIG. 3). As such, the piston rim portion 48 may be flat and the piston bowl 46 may be regarded as a cavity in the piston crown 20. Features relating to the piston bowl will be presented hereinbelow with reference to FIG. 4.

Figure 4:
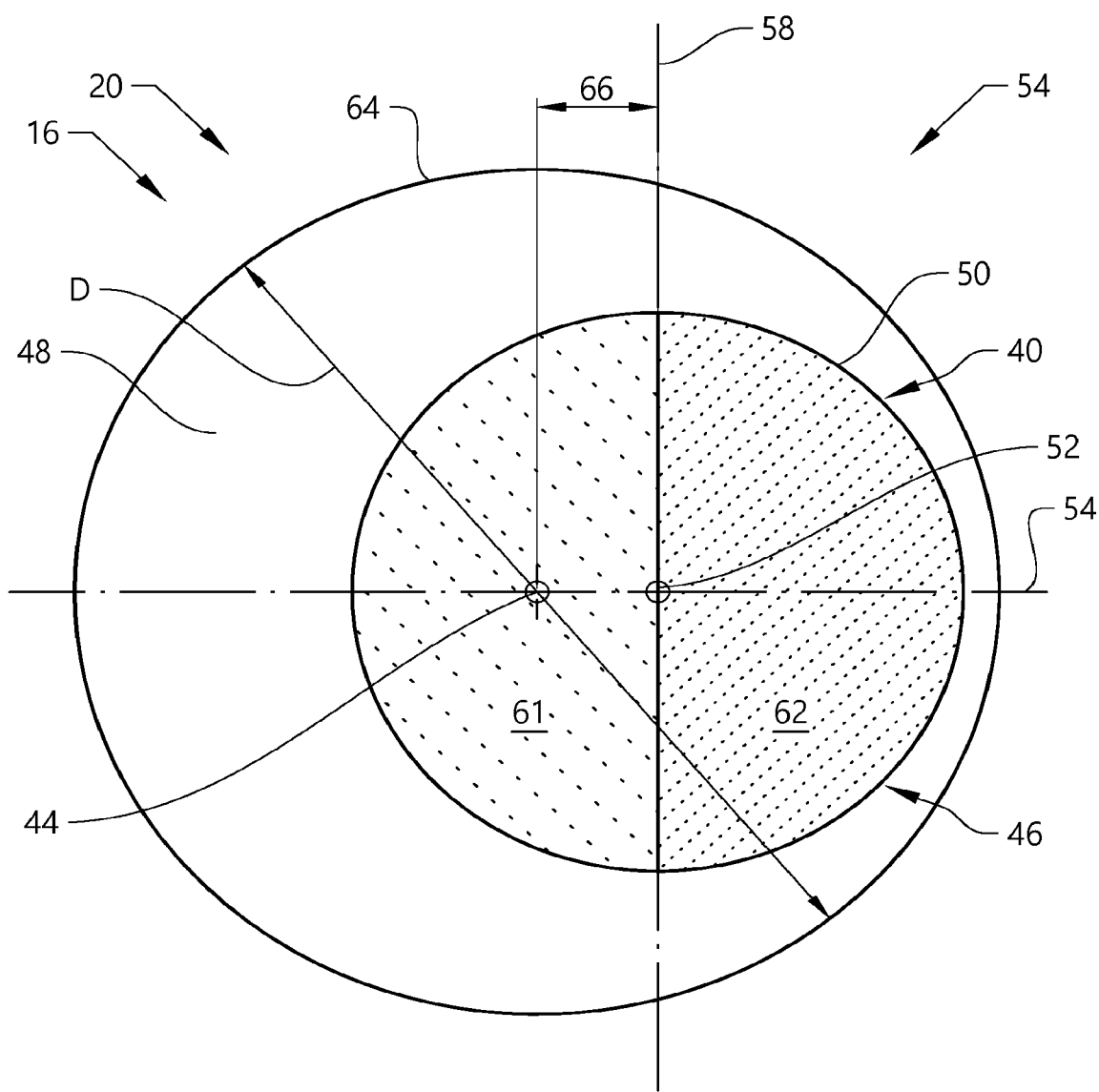
FIG. 4 illustrates a top view of the FIG. 3 piston.

As may be gleaned from FIG. 4, the piston bowl surface 40 has two halves: a proximal piston bowl surface half 61 and a distal piston bowl surface half 62. The piston bowl surface halves 61, 62 are separated by the second separating plane 58. The proximal piston bowl surface half 61 is located on the same side of the second separating plane 58 as the piston crown center point 44.

Purely by way of example, and as indicated in FIG. 4, the piston crown projection has an outer circumference with a circumference measure value 64, a distance 66 between the piston crown center point 44 and the opening center of gravity 52, in the piston crown plane 42 (see FIG. 3), being at least 1%, preferably at least 2%, of the circumference measure value 64.

In the embodiment illustrated in FIG. 4, the piston crown projection is circular and has a diameter D. For embodiments of the piston 16 with a circular piston crown projection, the distance 66 between the piston crown center point 44 and the opening center of gravity 52 may be at least 4%, preferably at least 8%, of the diameter D.

Furthermore, as indicated in FIG. 4, the piston crown 20 may have a single piston bowl 46.

Additionally, though purely by way of example, the area enclosed by the piston bowl opening 50 may be at least 30%, preferably at least 40%, of the area of the piston crown projection.

Figure 5:
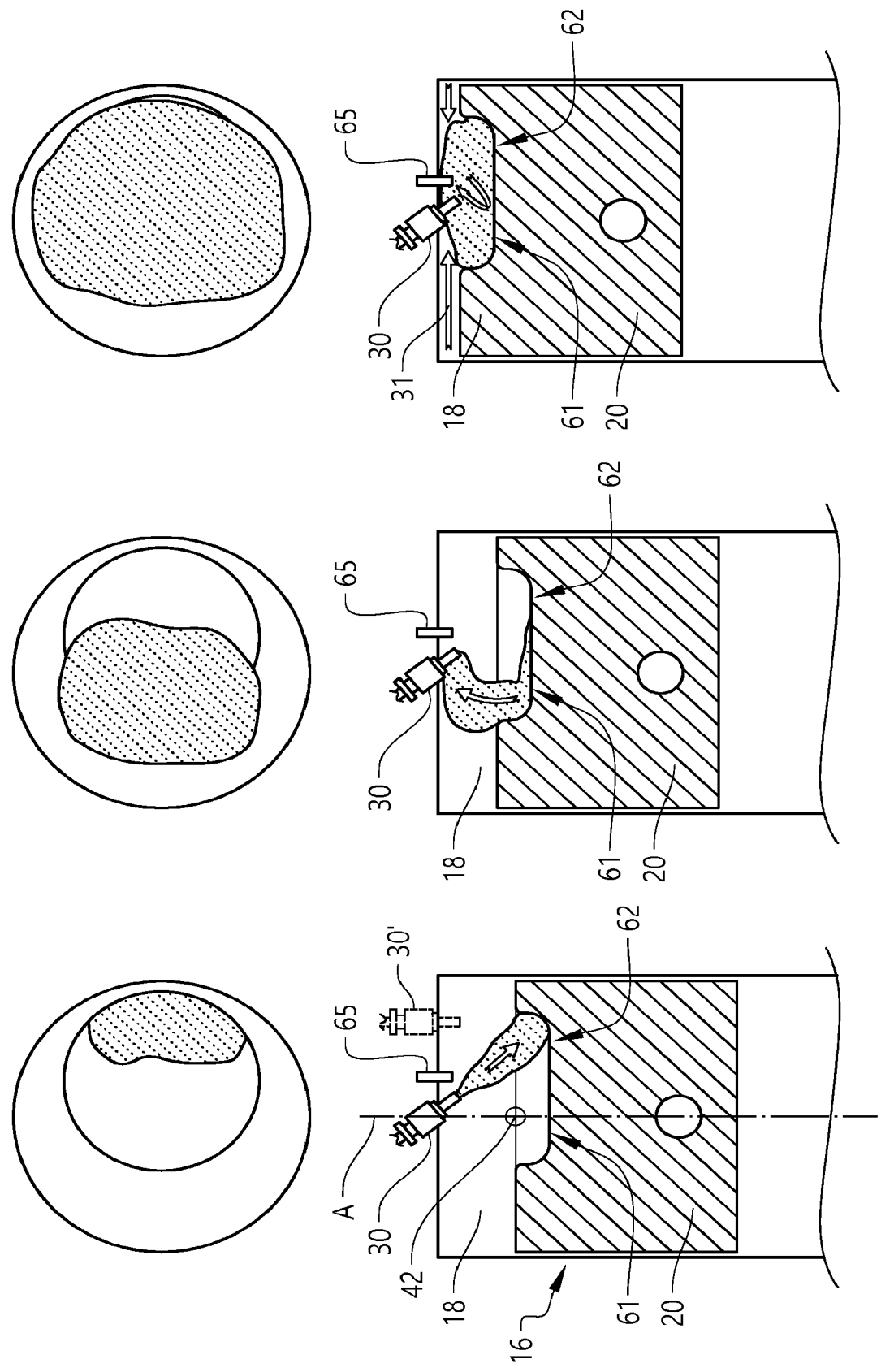
FIG. 5 schematically illustrates a side view of a portion of an internal combustion engine according to an embodiment of the present disclosure during certain parts of a combustion cycle.

Moreover, with reference to FIG. 5, the internal combustion engine 12 further comprises a fuel injector 30 for injecting gaseous fuel into the combustion chamber 18 such that, during operation of the internal combustion engine 12, a majority of fuel discharged from the fuel injector 30 is directed towards and impinges on the distal piston bowl surface half 62. Purely by way of example, the gaseous fuel may be, or may even consist of, hydrogen.

It should be noted that the embodiment illustrated in FIG. 5 should be seen as an example of the internal combustion engine 12 according to the present disclosure. As will be realized from the below description, see e.g. portions of the below description referring to any one of FIG. 11-FIG. 15, the fuel injector 30 for injecting gaseous fuel into the combustion chamber 18 may be such that, during operation of the internal combustion engine 12, a majority of fuel discharged from the fuel injector 30 is directed towards and impinges on the proximal piston bowl surface half 61 instead of the distal piston bowl surface half 62. As such, the fuel injector 30 for injecting gaseous fuel into said combustion chamber 18 is generally such that, during operation of said internal combustion engine 12, a majority of fuel discharged from said fuel injector 30 is directed towards and impinges on either said proximal piston bowl surface half 61 or said distal piston bowl surface half 62.

FIG. 5 illustrates a sequence from left to right in which gaseous fuel is injected from the fuel injector 30 such that the majority of fuel discharged from the fuel injector 30 is directed towards and impinges on the distal piston bowl surface half 62. As may be realized from the sequence indicated in FIG. 5, the injection of gaseous fuel in the manner presented above implies an appropriate tumbling motion of the fuel which implies an appropriate mixture of gaseous fuel and e.g. air before and/or during combustion. To this end, as indicated in FIG. 5, the internal combustion engine 12 may comprise a spark plug 64 for igniting the mixture of fuel and air.

As may be realized from the rightmost portion of FIG. 5, when the piston 16 approaches its top dead center, a squish flow 31 is obtained which may further enhance the mixing of the fuel and e.g., air. Preferably, an enhanced squish flow may be created on the side of the piston 16 that is located on the same side of the second separating plane 58 as the proximal piston bowl surface half 61 (see FIG. 4). Purely bay way of example, the side of the piston 16 that is located on the same side of the second separating plane 58 as the proximal piston bowl surface half 61 may be the side of the piston 16 that is located opposite to the location of the spark plug 65. The squish flow is enhanced since the area of the piston rim portion 48 located on the same side of the second separating plane 58 as the proximal piston bowl surface half 61 is significantly larger than the area of the piston rim portion 48 located on the same side of the second separating plane 58 as the distal piston bowl surface half 62 (see FIG. 4). The enhanced squish flow contributes with an additional flow-structure towards the spark plug 65 that together with the mean fuel flow induced tumble motion improves mixing of fuel and e.g., air.

As non-limiting examples, the majority of fuel—i.e., the amount of fuel that is directed towards and impinges on the distal piston bowl surface half 62—is at least 60%, preferably at least 70%, more preferred at least 80%, of fuel discharged from the fuel injector 30. In the embodiment illustrated in FIG. 5, the majority of fuel is directed towards and impinges on the distal piston bowl surface half 62 by virtue of the fact that the fuel injector 30 is inclined and directed towards the distal piston bowl surface half 62.

As such, the fuel injector 30 may be located approximately on the piston crown center point 44, following the reciprocal axis A, and may be inclined, viz arranged with an angle relative to the reciprocal axis A, so as to direct fuel towards the distal piston bowl surface half 62.

It should be noted that the fuel injector 30 may be implemented in other ways in order to ensure that the majority of fuel discharged from the fuel injector 30 is directed towards and impinges on the distal piston bowl surface half 62. Purely by way of example, the above fuel discharge characteristics of the fuel injector 30 may be obtained by the design of the fuel injector 30 as such, e.g., by an appropriate design of a nozzle cap (not shown) of the fuel injector.

Furthermore, as indicated by the fuel injector 30' by dotted lines in FIG. 5, the fuel injector may be located with an offset from the piston crown center point 44 and the fuel injector 30' may be adapted to inject fuel in a direction being substantially parallel to the reciprocal axis A towards the distal piston bowl surface half 62.

Irrespective of the location and/or orientation of the fuel injector 30, the fuel injector 30 may preferably be adapted to discharge fuel at a mean fuel injector exit velocity being equal to or exceeding 800 m/s, preferably equal to or exceeding 1200 m/s, more preferred equal to or exceeding 1600 m/s. As may be realized by the skilled person, the fuel injector exit velocity may differ amongst various portions, e.g., various areas of a nozzle (not shown) forming part of the fuel injector 30, of the fuel exiting the fuel injector 30. The mean fuel injector exit velocity is determined by calculating the mean value of the various portions of the fuel. As a non-limiting example, the mean fuel injector exit velocity may be determined by calculating or determining the fuel exit velocity for a plurality of different areas of a cross-section of the fuel spray exiting the fuel injector and calculating the mean value thereof.

Moreover, again irrespective of the location and/or orientation of the fuel injector 30, the fuel injector 30 may be adapted to discharge gaseous fuel at a discharge pressure being equal to or lower than 500 bar, preferably equal to or lower than 300 bar, more preferred equal to or lower than 100 bar.

Figure 6:
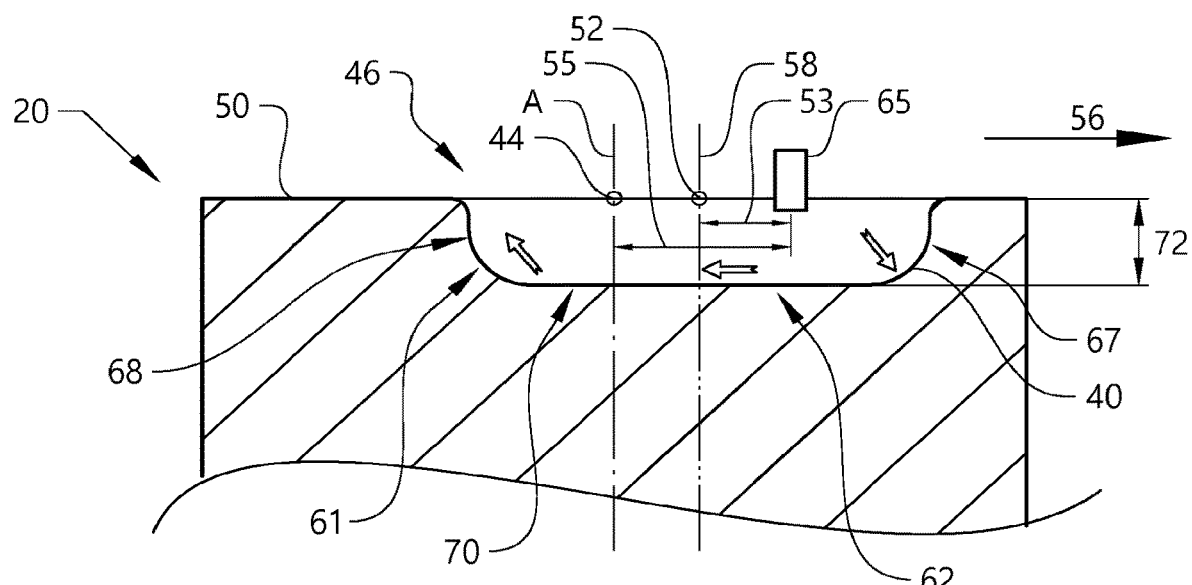
FIGS. 6-8 schematically illustrate a cross-sectional side view of various implementations of a piston.

Implementations of the piston bowl 46 will be presented hereinabove with reference to FIGS. 6-8. FIG. 6 illustrates a cross section of a piston crown 20. As indicated in FIG. 6, the distal piston bowl surface half 62 may comprise a distal piston bowl side wall 67 and the proximal piston bowl surface half 61 may comprise a proximal piston bowl side wall 68. At least portions of the distal piston bowl side wall 67 and the proximal piston bowl side wall 68, e.g., portions of the wall facing each other, may be connected to each other via a piston bowl bottom 70. As indicated by the arrows in FIG. 6, the side walls 67, 68 and the piston bowl bottom 70 imply an appropriate transfer of fuel from the distal piston bowl surface half 62 to the proximal piston bowl surface half 61. FIG. 6 illustrates an implementation of the piston crown 20 in which the piston bowl has a piston bowl depth 72. As used herein, the term "piston bowl depth" relates to the largest distance from the piston bowl opening 50 to a portion of the piston bowl surface 40, as seen along the reciprocal axis A.

Moreover, FIG. 6 further illustrates that an opening center of gravity to spark plug distance 53, in the first direction 56, from the opening center of gravity 52 to the spark plug 65, is smaller than a piston crown center point to spark plug distance 55, in the first direction 56, from the piston crown center point 44 to the spark plug 65. Preferably, and as indicated in FIG. 6, the spark plug 65 and the piston crown center point 44 are located on opposite sides of the opening center of gravity 52 as seen in the in the first direction 56.

A spark plug generally has a central electrode. As such, as used herein, the term opening center of gravity to spark plug distance 53 refers to the distance from the opening center of gravity to the central electrode of the spark plug.

Moreover, the piston crown projection may have an outer circumference with a circumference measure value 64, see e.g., FIG. 4. Purely by way of example, the opening center of gravity to spark plug distance 53 may be less than at least 10%, preferably less than 5%, more preferred less than 1%, of the circumference measure value 64.

Furthermore, though again purely by way of example, a spark plug projection, being a projection of the spark plug 65 in a direction parallel to the reciprocal axis A and onto the piston crown plane 42, is located in the second separating plane 58 or in the distal piston bowl surface half 62. In the FIG. 6 example, the spark plug projection is located in the distal piston bowl surface half 62.

In the FIG. 6 implementation of the piston crown 20, the depth—viz the largest distance from the piston bowl opening 50 to the piston bowl surface 40—is the same for the distal piston bowl surface half 62 and the proximal piston bowl surface half 61. FIG. 7 and FIG. 8 illustrate alternative implementations of the piston crown 20. In the FIG. 7 implementation, the depth—i.e., the largest distance from the piston bowl opening 50 to the piston bowl surface 40—is located in the distal piston bowl surface half 62 and in the FIG. 8 implementation, the depth—i.e., the largest distance from the piston bowl opening 50 to the piston bowl surface 40—is located in the proximal piston bowl surface half 61.

Figure 7:
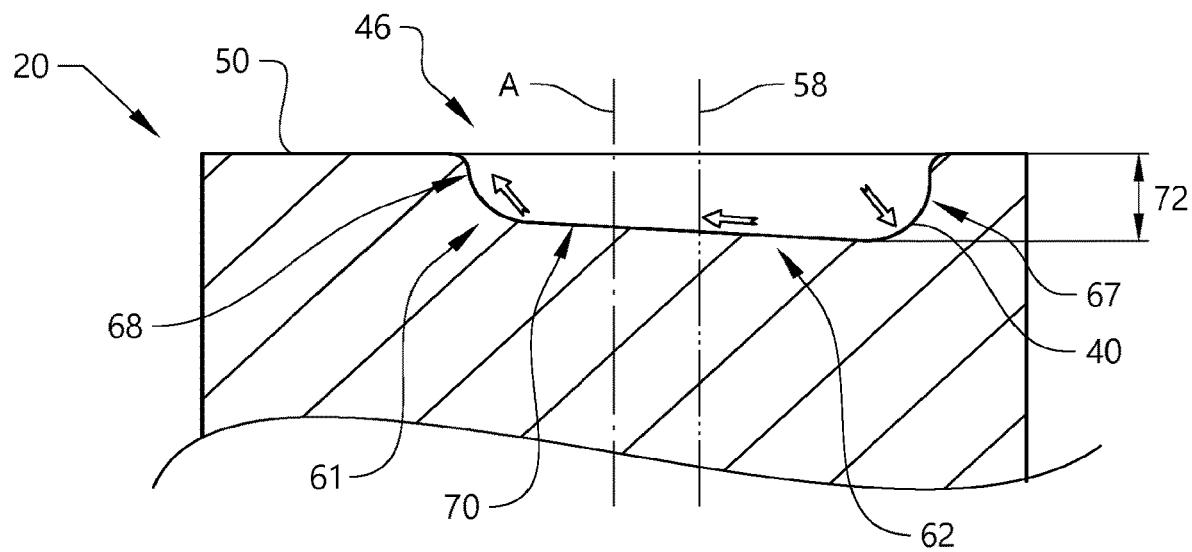
Figure 8:
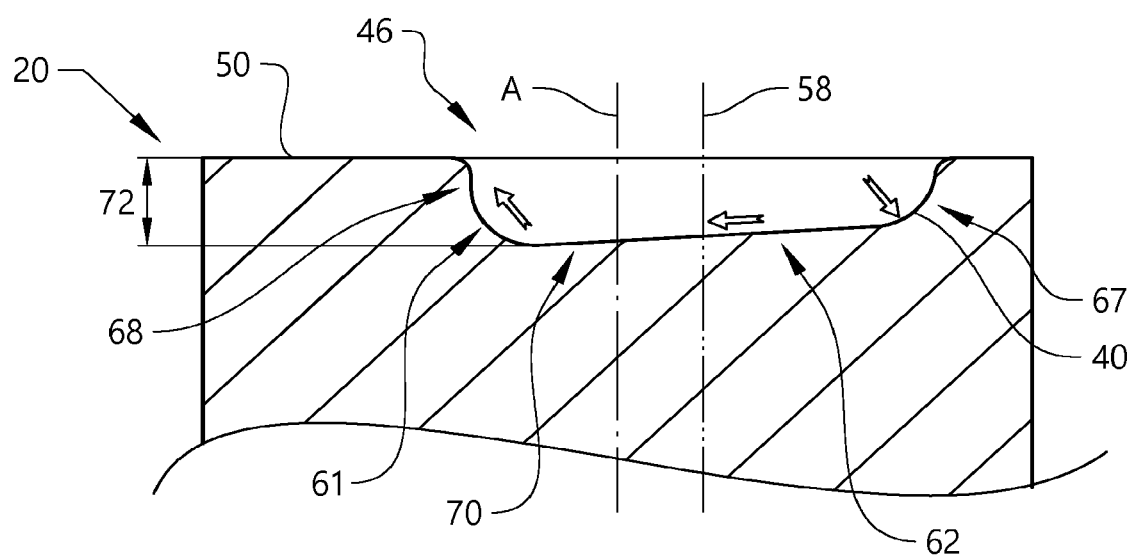

Irrespective of the shape of the piston bowl 46, for instance irrespective of whether or not any one of the FIG. 6-8 embodiments are employed, an upper portion 74 (see FIG. 9) of the proximal piston bowl side wall 68 extends from the piston rim portion 50 and in a direction into the piston bowl 46, as seen along the reciprocal axis A, in a range of 0-50%, preferably in a range of 0-30%, more preferred in a range of 0-20%, of the piston bowl depth.

Figure 9:
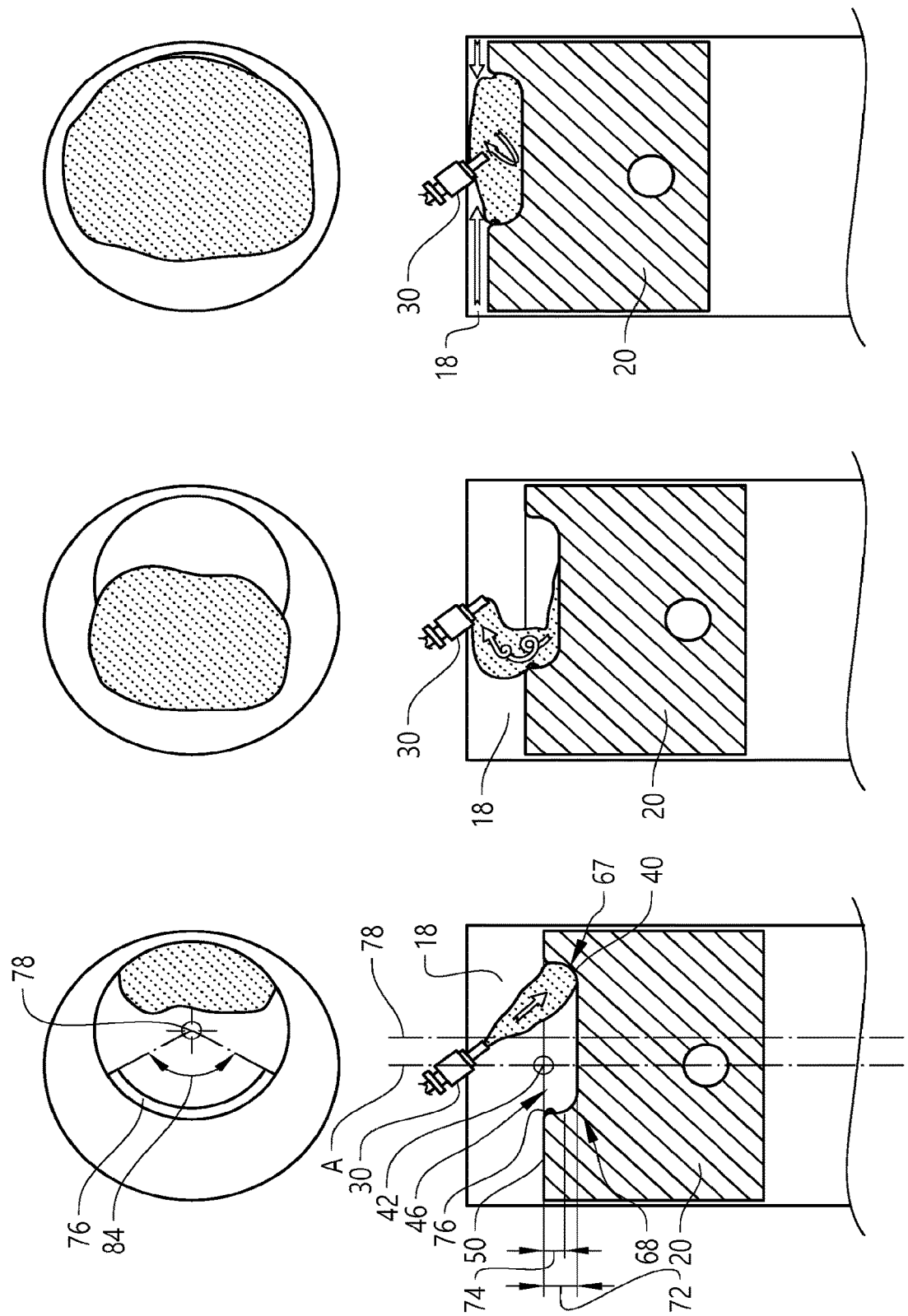
FIG. 9 schematically illustrates a side view of a portion of an internal combustion engine according to another embodiment of the present disclosure during certain parts of a combustion cycle.

As such, with reference to FIG. 9, the upper portion 74 of the proximal piston bowl side wall 68 may comprise an opening protrusion 76 extending in a direction towards an intersection line 78 formed by the intersection of the first separating plane 54 and the second separating plane 58. For the sake of clarity, the first and second separating planes are not included in FIG. 9, instead, reference is made to FIG. 3.

The opening protrusion 76 in accordance with the above implies that a local turbulence may be obtained at the proximal piston bowl side wall 68. Such a local turbulence, which is indicated by eddies in FIG. 9, in turn implies an appropriate mixing of fuel and e.g. air for instance prior to or during combustion.

Figure 10:
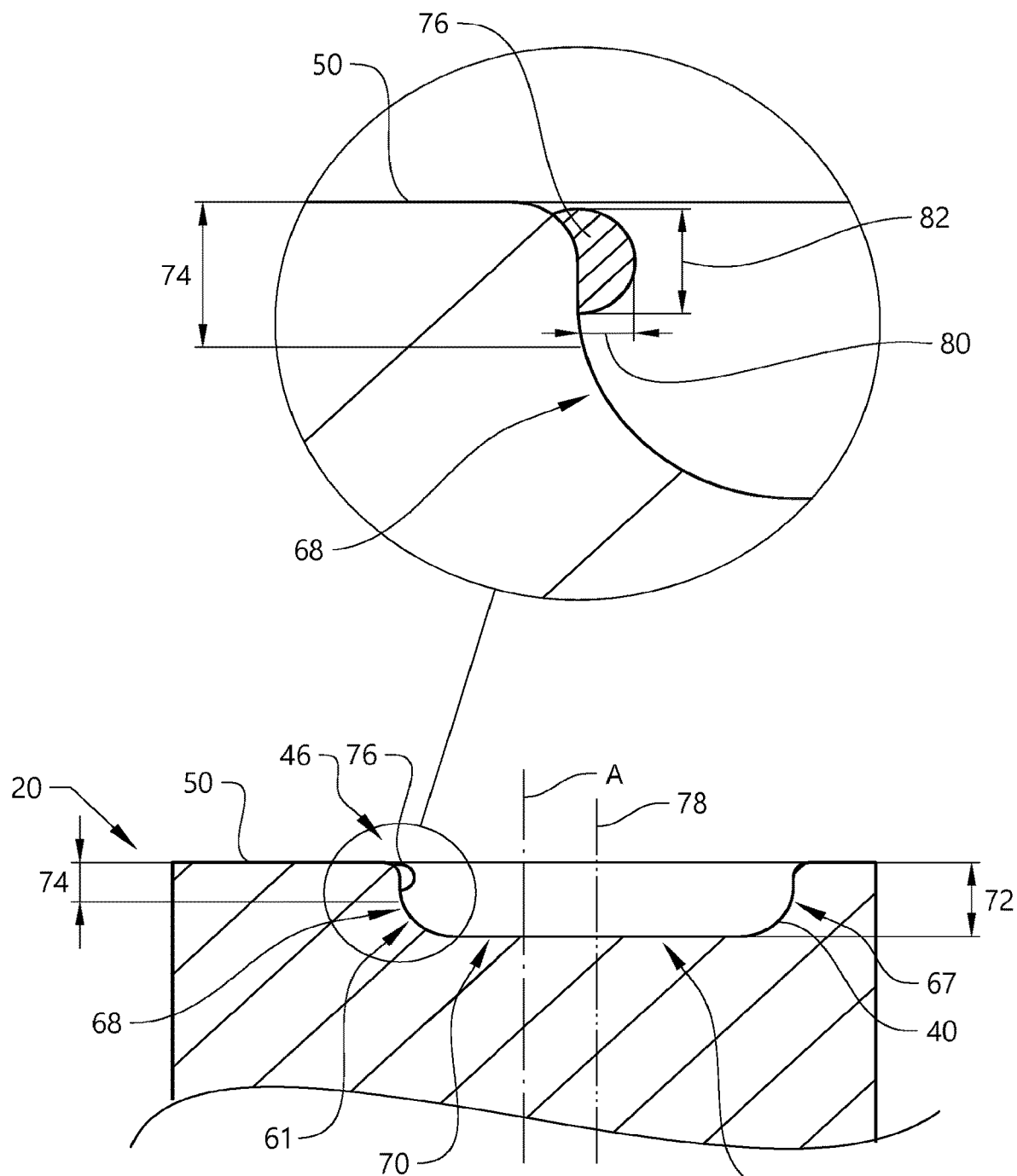
FIG. 10 schematically illustrate a cross-sectional side view of another implementation of a piston.

Characteristics of the opening protrusion 76 will be discussed hereinbelow with reference to FIG. 10. To this end, though purely by way of example, the FIG. 10 opening protrusion 76 has an opening protrusion width 80 being a measure from a portion of the piston bowl surface 40 adjacent to the opening protrusion 76 to the portion of the opening protrusion 76 being closest to intersection line 78. Moreover, as further indicated in FIG. 10, the opening protrusion 76 has an opening protrusion height 82 in the reciprocal axis A. Purely by way of example, the opening protrusion height 82 may be in the range of 20-200%, preferably 50-150%, of the opening protrusion width 80. As such, the opening protrusion 76 may preferably be relatively distinct in relation to adjacent portions of the proximal piston bowl side wall 68.

Purely by way of example, the opening protrusion 76 may form an integral part of the piston 16. As another non-limiting example, the opening protrusion 76 may be a separate element (not shown) that is connected to the remaining part of the piston 16 by means of a joint, such as a weld joint. It is also envisaged that the opening protrusion 76 may be constituted by a welding string (not shown) which is applied to the piston 16.

Furthermore, as has been intimated hereinabove with reference to FIG. 4, the piston crown projection has an outer circumference with a circumference measure value 64. The opening protrusion 76 may have an opening protrusion width 80 being in the range of 0.01-1% of the circumference measure value 64.

Additionally, with reference to FIG. 9, the opening protrusion 76 has an opening protrusion angular extension 84 around the intersection line 78. The opening protrusion angular extension 84 may be in the range of 100-240°, preferably in the range of 160-200°.

In the above embodiments of the present disclosure, the fuel injector 30 for injecting gaseous fuel into the combustion chamber 18) is such that, during operation of the internal combustion engine 12, a majority of fuel discharged from the fuel injector 30 is directed towards and impinges on the distal piston bowl surface half 62. However, it is also envisaged that in embodiments of the present disclosure, the fuel injector 30 for injecting gaseous fuel into the combustion chamber 18 is such that, during operation of the internal combustion engine 12, a majority of fuel discharged from the fuel injector 30 is directed towards and impinges on the proximal piston bowl surface half 61.

Figure 11:
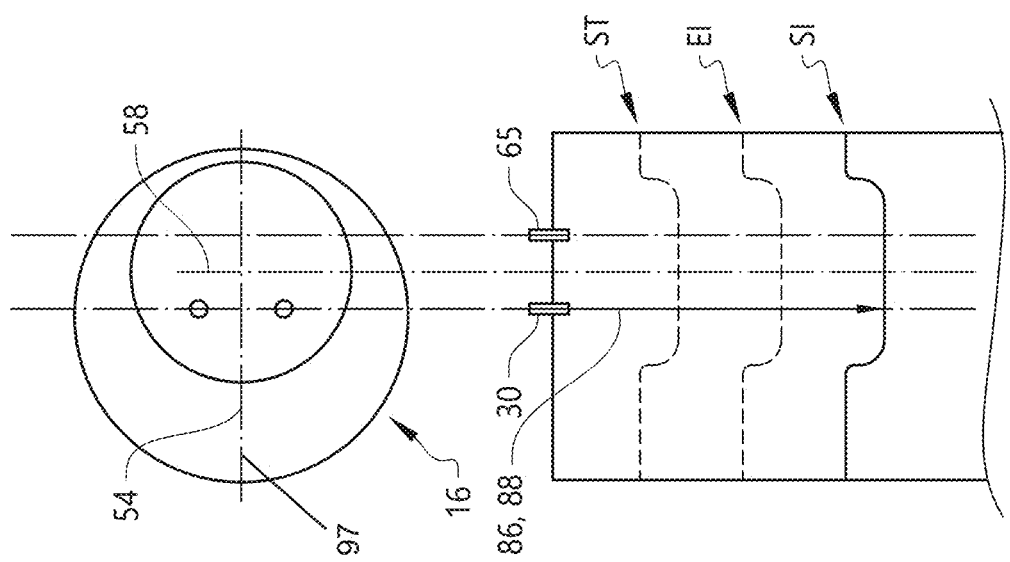
FIG. 11 illustrates schematic top and side views of a portion of another embodiment of another internal combustion engine in accordance with the present disclosure.

To this end, reference is made to FIG. 11 illustrating an embodiment of the internal combustion engine 12 in which the distal piston bowl surface half 62 comprises a distal piston bowl side wall 67 and the proximal piston bowl surface half 61 comprises a proximal piston bowl side wall 68. In a similar manner as has been mentioned hereinabove, at least portions of the distal piston bowl side wall 67 and the proximal piston bowl side wall 68 may be connected to each other via a piston bowl bottom 70.

Moreover, as for FIG. 6 hereinabove, FIG. 11 further illustrates that an opening center of gravity to spark plug distance 53, in the first direction 56, from the opening center of gravity 52 to the spark plug 65, is smaller than a piston crown center point to spark plug distance 55, in the first direction 56, from the piston crown center point 44 to the spark plug 65. Preferably, and as indicated in FIG. 11, the spark plug 65 and the piston crown center point 44 are located on opposite sides of the opening center of gravity 52 as seen in the in the first direction 56.

Furthermore, the piston crown projection may have an outer circumference with a circumference measure value 64. Purely by way of example, the opening center of gravity to spark plug distance 53 may be less than at least 10%, preferably less than 5%, more preferred less than 1%, of the circumference measure value 64.

Furthermore, though again purely by way of example, a spark plug projection, being a projection of the spark plug 65 in a direction parallel to the reciprocal axis A and onto the piston crown plane 42, is located in the second separating plane 58 or in the distal piston bowl surface half 62. In the FIG. 11 example, the spark plug projection is located in the distal piston bowl surface half 62.

Figure 12:
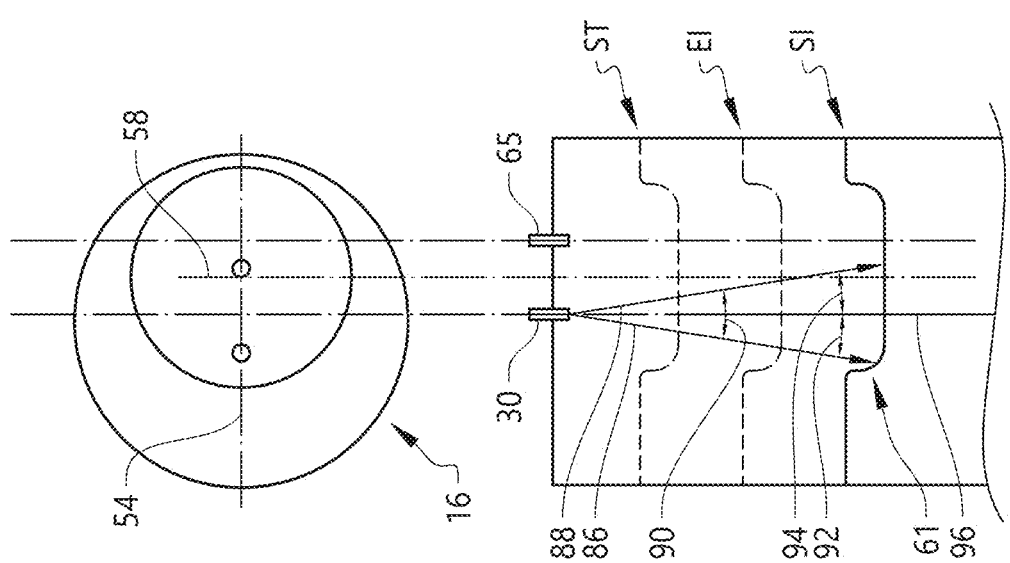
FIG. 12 illustrates schematic top and side views of a portion of a further embodiment of another internal combustion engine in accordance with the present disclosure.

Various embodiments of the internal combustion engine 12 will be presented hereinbelow with reference to FIGS. 12-15. Each one of FIGS. 12-15 presents a top view of the piston 16 as well as three side view of the piston 16 in various positions. With reference to FIG. 12, the bottommost position of the piston 16 represents a position of the piston 16 when injection of fuel is started. The bottommost position is indicated by letters SI in FIG. 12. The uppermost position of the piston 16 represents a position of the piston 16 when the spark plug 65 produces a spark. Consequently, the uppermost position is indicated by ST in FIG. 12, wherein ST stands for spark timing. For illustration purposes, the uppermost position of the piston 16 is illustrated at a distance from a cylinder head surface accommodating e.g., the fuel injector 30. However, it is envisaged that the cylinder 16 may be located relatively close to the cylinder head surface, for instance at approximately one millimeter from the cylinder head surface, when the cylinder is in the uppermost position of the piston 16.

Finally, an intermediate position between the bottommost position SI and the uppermost position ST represents a position of the piston 16 when injection of fuel is ended, wherein the intermediate position is indicated by letters EI, indicating end of injection.

With reference to FIG. 12, the fuel injector 30 comprises a first opening and a second opening, which openings preferably are located in a nozzle tip of the fuel injector, the first opening being adapted to discharge gaseous fuel in a first opening direction 86 and the second opening being adapted to discharge gaseous fuel in a second opening direction 88. The first opening direction 86 and the second opening direction 88 form an angle 90 in a range of 10°-80°, preferably in a range of 15°-60°, more preferred in a range of 20°-40°.

In particular, with reference to FIG. 12, each one of the first opening direction 86 and the second opening direction 88 forms an angle 92, 96 with a reference plane 96 being parallel to the second separating plane 58. The absolute value of each angle 92, 96 may be in the range of 0-5°, preferably in the range of 0-2°. Purely by way of example, the absolute value of the angle that the first opening direction 86 forms with the reference plane 96 may be equal to the absolute value of the angle that the second opening direction 88 forms with the reference plane 96. However, it is also contemplated that in embodiments of the internal combustion engine 12, the absolute value of the angle that the first opening direction 86 forms with the reference plane 96 may be different from the absolute value of the angle that the second opening direction 88 forms with the reference plane 96.

As may be realized from FIG. 12, at least when the piston 16 is in the intermediate position EI, a majority of fuel discharged from the fuel injector 30 is directed towards and impinges on the proximal piston bowl surface half 61. Moreover, as may be realized from FIG. 12, at least in the intermediate position EI, the at least 60%, preferably at least 70%, more preferred at least 80%, of fuel discharged from said fuel injector 30 is directed towards and impinges on the proximal piston bowl surface half 61.

In the FIG. 12 embodiment, each one of the first opening direction 86 and the second opening direction 88 extends in a plane that is substantially parallel to the first separating plane 54. However, it is envisaged that at least one of first opening direction 86 and the second opening direction 88 may extend in other directions in other embodiments of the internal combustion engine 12.

Figure 13:
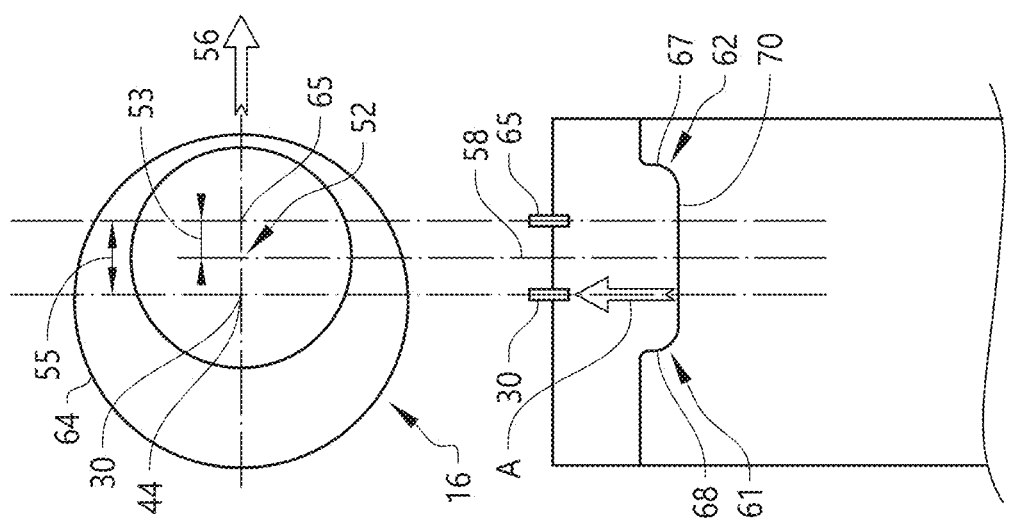
FIG. 13 illustrates schematic top and side views of a portion of yet another embodiment of another internal combustion engine in accordance with the present disclosure.

To this end, reference is made to FIG. 13 illustrating an embodiment that is similar to the FIG. 12 embodiment but wherein each one of the first opening direction 86 and the second opening direction 88 forms an angle with a reference plane 97 being parallel to the first separating plane 54. As for the FIG. 12 embodiment, the absolute value of each one of the angles may be in the range of 0-5°, preferably in the range of 0-2°.

Figure 14:
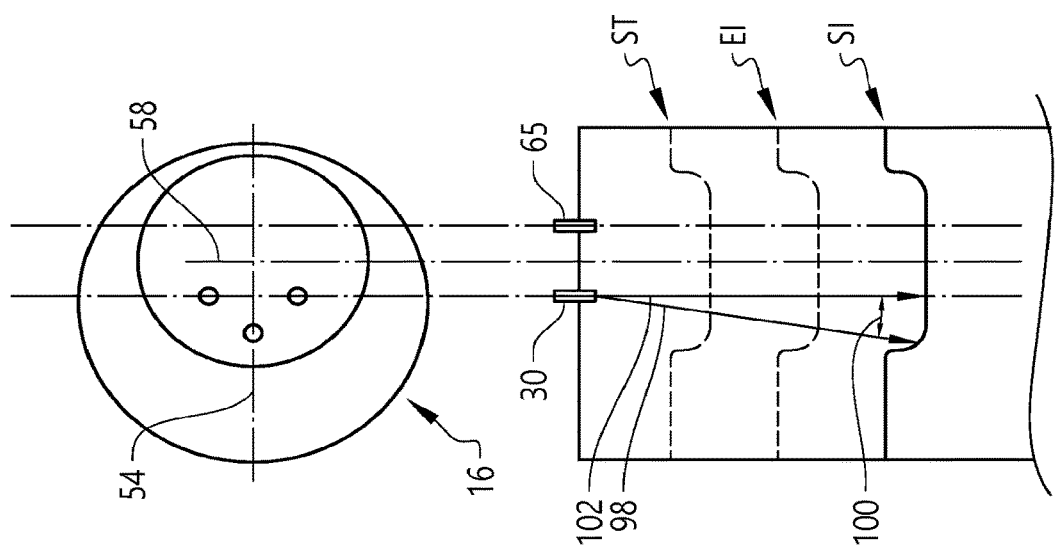
FIG. 14 illustrates schematic top and side views of a portion of another embodiment of another internal combustion engine in accordance with the present disclosure.

Furthermore, in embodiments of the internal combustion engine 12, the fuel injector may comprise more than two openings. To this end, reference is made to FIG. 14 illustrating an embodiment comprising a fuel injector 30 which in turn comprises a third opening. The third opening is adapted to discharge gaseous fuel in a third opening direction 98. The third opening direction 98 forms an angle 100 with a second reference plane 102 being parallel to the second separating plane 58. The absolute value of the angle 100 is in the range of 5°-30°, preferably in the range of 10°-20°.

Figure 15:
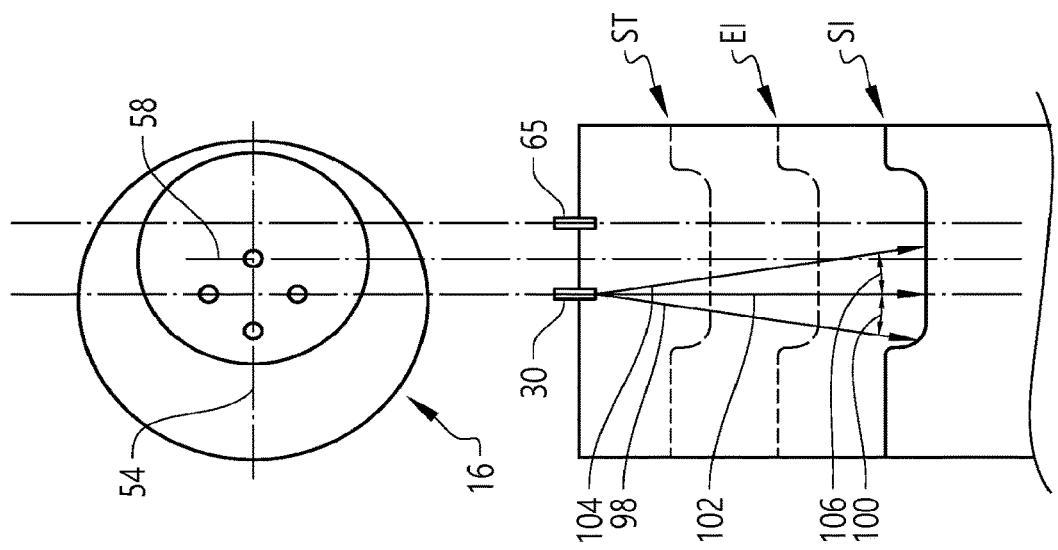
FIG. 15 illustrates schematic top and side views of a portion of an additional embodiment of another internal combustion engine in accordance with the present disclosure.

In the embodiment illustrated in FIG. 15, the fuel injector 30 comprises a fourth opening. The fourth opening is adapted to discharge gaseous fuel in a fourth opening direction 104. The third opening direction 98 and the fourth opening direction 104 are in opposite directions from the second reference plane 102. The fourth opening direction 104 forms an angle 106 with the second reference plane 102. The absolute value of the angle 106 is in the range of 5°-30°, preferably in the range of 10°-20°.

It is also contemplated that in embodiments of the internal combustion engine 12, the fuel injector 30 may comprise at least six openings, preferably at least eight openings. Of course, it is also contemplated that embodiments of the internal combustion engine may comprise a fuel injector with a single opening.

It is to be understood that the present disclosure is not limited to the embodiments described above and illustrated in the drawings; rather, the skilled person will recognize that many changes and modifications may be made within the scope of the appended claims.

The invention claimed is:

1. An internal combustion engine for gaseous fuel, said internal combustion engine comprising a cylinder and a piston for reciprocal movement in said cylinder along a reciprocal axis, whereby a combustion chamber is at least partially delimited by said cylinder and said piston, said piston comprising a piston crown facing said combustion chamber, a piston crown projection of said piston crown in a direction parallel to said reciprocal axis and onto a piston crown plane extending transversally to said reciprocal axis having a piston crown centre point, said piston crown comprising a piston bowl surface, defining a piston bowl, and a piston rim portion, wherein said piston rim portion encloses said piston bowl surface and a piston bowl opening is the intersection between said piston rim portion and said piston bowl surface, said piston bowl opening having an opening centre of gravity in said piston crown plane, said opening centre of gravity being offset from said piston crown centre point, wherein a first separating plane extends in a first direction as well as in a direction parallel to said reciprocal axis and intersects said piston crown centre point as well as said opening centre of gravity, wherein a second separating plane extends in a second direction transversal to said first direction as well as in a direction parallel to said reciprocal axis and intersects said opening centre of gravity, said piston bowl surface having two halves: a proximal piston bowl surface half and a distal piston bowl surface half, said piston bowl surface halves being separated by said second separating plane, wherein said proximal piston bowl surface half is located on the same side of said second separating plane as said piston crown centre point, said internal combustion engine further comprising a spark plug adapted to produce a spark in said combustion chamber, said internal combustion engine further comprising a fuel injector for injecting gaseous fuel into said combustion chamber such that, during operation of said internal combustion engine, a majority of fuel discharged from said fuel injector is directed towards and impinges on either said proximal piston bowl surface half or said distal piston bowl surface half, wherein said fuel injector is adapted to discharge gaseous fuel at a discharge pressure being equal to or lower than 100 bar.

2. The internal combustion engine according to claim 1, wherein an opening centre of gravity to spark plug distance, in said first direction, from said opening centre of gravity to said spark plug, is smaller than a piston crown centre point to spark plug distance, in said first direction, from said piston crown centre point to said spark plug.

3. The internal combustion engine according to claim 2, wherein said piston crown projection has an outer circumference with a circumference measure value, said opening centre of gravity to spark plug distance being less than 10% of said circumference measure value.

4. The internal combustion engine according to claim 1, wherein a spark plug projection, being a projection of said spark plug in a direction parallel to the reciprocal axis and onto said piston crown plane, is located in said second separating plane or in said distal piston bowl surface half.

5. The internal combustion engine according to claim 1, wherein said majority of fuel is at least 60% of fuel discharged from said fuel injector.

6. The internal combustion engine according to claim 1, wherein said fuel injector is adapted to discharge gaseous fuel at a mean fuel injector exit velocity being equal to or exceeding 800 m/s.

7. The internal combustion engine according to claim 1, wherein said piston rim portion extends in a rim portion plane being parallel to said piston crown plane, said piston bowl surface being located on the side of said piston rim portion plane being opposite to the combustion chamber.

8. The internal combustion engine according to claim 1, wherein said fuel injector for injecting gaseous fuel into said combustion chamber is such that, during operation of said internal combustion engine, a majority of fuel discharged from said fuel injector is directed towards and impinges on said distal piston bowl surface half.

9. The internal combustion engine according to claim 8, wherein said distal piston bowl surface half comprises a distal piston bowl side wall and said proximal piston bowl surface half comprises a proximal piston bowl side wall, at least portions of said distal piston bowl side wall and said proximal piston bowl side wall being connected to each other via a piston bowl bottom.

10. The internal combustion engine according to claim 9, wherein said piston bowl surface has a piston bowl depth being the largest distance from said piston bowl opening to said piston bowl surface, as seen along said reciprocal axis, an upper portion of said proximal piston bowl side wall extends from said piston rim portion and in a direction into said piston bowl, as seen along said reciprocal axis, in a range of 0-50% of said piston bowl depth, said upper portion of said proximal piston bowl side wall comprising an opening protrusion extending in a direction towards an intersection line formed by the intersection of the first separating plane and the second separating plane.

11. The internal combustion engine according to claim 10, wherein said piston crown projection has an outer circumference with a circumference measure value, said opening protrusion having an opening protrusion width being a measure from a portion of said piston bowl surface adjacent to said opening protrusion to the portion of said opening protrusion being closest to said intersection line, said protrusion width being in the range of 0.01-2% of said circumference measure value.

12. The internal combustion engine according to claim 11, wherein said opening protrusion has an opening protrusion height in said reciprocal axis, said opening protrusion height being in the range of 20-200% of said opening protrusion width.

13. The internal combustion engine according to claim 10, wherein said opening protrusion has an opening protrusion angular extension around said intersection line, said opening protrusion angular extension being in the range of 100-240°.

14. The internal combustion engine according to claim 1, wherein said fuel injector for injecting gaseous fuel into said combustion chamber is such that, during operation of said internal combustion engine, a majority of fuel discharged from said fuel injector is directed towards and impinges on said proximal piston bowl surface half.

15. The internal combustion engine according to claim 14, wherein said distal piston bowl surface half comprises a distal piston bowl side wall and said proximal piston bowl surface half comprises a proximal piston bowl side wall, at least portions of said distal piston bowl side wall and said proximal piston bowl side wall being connected to each other via a piston bowl bottom.

16. The internal combustion engine according to claim 14, wherein said fuel injector comprises a first opening and a second opening, said first opening being adapted to discharge gaseous fuel in a first opening direction and said second opening being adapted to discharge gaseous fuel in a second opening direction, said first opening direction and said second opening direction forming an angle in a range of 10°-80°.

17. The internal combustion engine according to claim 16, wherein each one of said first opening direction and said second opening direction forms an angle with a reference plane being parallel to said second separating plane, the absolute value of said angle being in the range of 0-5°.

18. The internal combustion engine according to claim 16, wherein each one of said first opening direction and said second opening direction forms an angle with a reference plane being parallel to said first separating plane, the absolute value of said angle being in the range of 0-5°.

19. The internal combustion engine according to claim 18, wherein said fuel injector comprises a third opening, said third opening being adapted to discharge gaseous fuel in a third opening direction, said third opening direction forming an angle with a second reference plane being parallel to said second separating plane, the absolute value of said angle being in the range of 5°-30°.

20. The internal combustion engine according to claim 19, wherein said fuel injector comprises a fourth opening, said fourth opening being adapted to discharge gaseous fuel in a fourth opening direction, said third opening direction and said fourth opening direction being in opposite directions from said second reference plane, said fourth opening direction forming an angle with said second reference plane, the absolute value of said angle being in the range of 5°-30°.

* * * * *